United States Patent
Yamada et al.

(10) Patent No.: US 8,936,385 B2
(45) Date of Patent: Jan. 20, 2015

(54) SPREAD ILLUMINATING APPARATUS

(75) Inventors: Taku Yamada, Kitasaku-gun (JP);
Shinji Kawai, Kitasaku-gun (JP);
Tomoko Ohara, Kitasaku-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 162 days.

(21) Appl. No.: 13/442,148

(22) Filed: Apr. 9, 2012

(65) Prior Publication Data

US 2012/0257413 A1 Oct. 11, 2012

(30) Foreign Application Priority Data

Apr. 11, 2011 (JP) .................. 2011-087279

(51) Int. Cl.
*F21V 7/04* (2006.01)
*F21V 8/00* (2006.01)
*G02F 1/1335* (2006.01)

(52) U.S. Cl.
CPC ............ *G02B 6/0036* (2013.01); *G02B 6/0091* (2013.01); *G02F 1/133615* (2013.01)
USPC ......................................... 362/624; 362/627

(58) Field of Classification Search
USPC .................................. 362/624, 627, 612, 608
See application file for complete search history.

(56) References Cited

U.S. PATENT DOCUMENTS

| | | | | |
|---|---|---|---|---|
| 2002/0181225 A1* | 12/2002 | Matsushita | ..................... | 362/31 |
| 2008/0117356 A1* | 5/2008 | Oku et al. | ....................... | 349/62 |
| 2010/0007818 A1* | 1/2010 | Saitoh et al. | ..................... | 349/61 |
| 2011/0285927 A1* | 11/2011 | Schultz et al. | .................. | 349/15 |
| 2012/0081922 A1* | 4/2012 | Yeh et al. | ...................... | 362/612 |

FOREIGN PATENT DOCUMENTS

JP      A-2010-528326      8/2010

\* cited by examiner

*Primary Examiner* — Julie Bannan
(74) *Attorney, Agent, or Firm* — Oliff PLC

(57) ABSTRACT

A side-light type spread illuminating apparatus includes a light guiding plate; a light source arranged along a light entering face of the light guiding plate; a double-sided prism sheet arranged at a light emitted face side of the light guiding plate; and an optical member arranged at a back face side facing the light emitted face of the light guiding plate. The optical member includes a light absorption member allowing prevention of reflection of light that has been introduced into the optical member.

10 Claims, 5 Drawing Sheets

| SAMPLE NO. | TOTAL REFLECTION RATE[%] | CROSSTALK[%] | BRIGHTNESS[cd/m²] |
|---|---|---|---|
| 1 | 99% | 7.3 | 12400 |
| 2 | 72% | 6.6 | 12100 |
| 3 | 48% | 6.0 | 11000 |
| 4 | 26% | 5.3 | 9590 |
| 5 | 7% | 4.6 | 8180 |
| 6 | 5% | 4.6 | 8150 |

SPREAD ILLUMINATING APPARATUS

BACKGROUND OF THE INVENTION

1. Field of the Invention

The present invention relates to a backlight applied to a liquid crystal display unit, and particularly relates to a spread illuminating apparatus, which is preferable for a backlight of a liquid crystal display unit used for a glasses-free 3D display system.

2. Description of the Related Art

In recent years, a glasses-free 3D display system where viewers are allowed to observe three-dimensional (3D) images with no dedicated equipment such as glasses has been widely noticed. In conventional glasses-free 3D display systems, the following technologies are introduced to realize glasses-free 3D display. That is, left eye images and right eye images, which are displayed on a liquid crystal display device, are provided only toward a left eye or a right eye, respectively by controlling the light distribution of illuminating light emitted from a backlight. See Japanese Patent Application Laid-Open No. 2010-528326 (hereinafter referred to as the "Patent document").

As illustrated in FIG. 6A, a display system 110 disclosed in the Patent document includes a liquid crystal display panel 120, a backlight 130 that supplies light to the liquid crystal display panel 120, and a double-sided prism film 140 that is arranged between the liquid crystal display panel 120 and the backlight 130. The backlight 130 includes a light guiding plate 125, a right eye image solid light source 132 arranged at a first light input face 131 of the light guiding plate 125, and a left eye image solid light source 134 arranged at a second light input face 133. Further, not illustrated, a reflection member, which returns leakage light to the light guiding plate 125, is generally arranged at a rear face 136 side of the light guiding plate 125.

The double-sided prism film 140 includes triangle prism rows facing a light output face 135 of the light guiding plate 125, the rows extending approximately in parallel to the first and second light input faces 131, 133. Further, the double-sided prism film 140 includes cylindrical lens rows facing the display panel 120, the rows also extending approximately in parallel to the first and second light input faces 131, 133. With the above structure, the directivity of light, which has been introduced from the first light input face 131 to the light guiding plate 125 and then exited out from the light output face 135, is adapted to change toward a right eye 101b of a viewer. On the other hand, the directivity of light, which has been introduced from the second light input face 133 to the light guiding plate 125 and then exited out from the light output face 135, is adapted to change toward a left eye 101a of the viewer.

In the display system 110, right eye images and left eye images are displayed alternately on the display panel 120. Here, the right eye image solid light source 132 is turned on (concurrently, the left eye image solid light source 134 is turned off) when the right eye images are to be displayed. Subsequently, the left eye image solid light source 134 is turned on (concurrently, the right eye image solid light source 132 is turned off) when the left eye images are to be displayed. In this manner, the right eye images and the left eye images are selectively provided respectively to the right eye 101b and the left eye 101a of the viewer.

The display system 110 includes a periodic driving element 150 and an image source 160 to enable the above operations.

In the glasses-free 3D display system, a so-called crosstalk has been generally known as one of the problems making complete separation between the right eye images and the left eye images failed. This crosstalk tends to occur in case that the right eye images with certain brightness are faultily supplied to the left eye of the viewer while the left eye images with certain brightness are faultily supplied to the right eye of the viewer.

For example, in the glasses-free display system of the display system 110, the following is one of the causes that such crosstalk arises. That is, partial light, which has been emitted from the right eye image solid light source 132 and then introduced into the light guiding plate 125 through the first light input face 131, arrives to the second light input face 133 without being emitted out from the light output face 135. The partial light is then reflected at the second light input face 133, and emitted from the light output face 135. The reflected light will then direct toward the left eye 101a of the viewer. The same can be said about light that has been emitted from the left eye image solid light source 134 and introduced into the light guiding plate 125 through the second light input face 133.

In the Patent document, as illustrated FIG. 6B, a reflection preventing mechanism 137 is formed on the second light input face 133. Light that has been emitted from the right eye image solid light source 132 and then introduced into the light guiding plate 125 through the first light input face 131 can be prevented from reflecting at the second light input face, contributing to the reduction of crosstalk. Here, light that has been emitted from the left eye image solid light source 134 is introduced into the light guiding plate 125 by passing through each input opening 138 at which the reflection preventing mechanism 137 is not formed. The same reflection preventing mechanism and input opening are also formed at the first light input face 131.

SUMMARY OF THE INVENTION

In the glasses-free 3D display system, however, further reduction of crosstalk has been an important issue for improving display quality of images.

In the light of the above issue, it is an object of the present invention to provide a spread illuminating apparatus allowing effective reduction of crosstalk when applying to the backlight of a liquid crystal display device for a glasses-free 3D display system.

Having conducted intensive studies for solving the above issue, the inventors have found that light reflected from the back-surface film (the reflection member) of a light guiding plate contains relatively large amounts of components which increase crosstalk. The present invention has been achieved based on such a new finding.

Following aspects exemplifying structures of the present invention are described as itemized to facilitate understanding of various structures of the present invention. Each aspect is not intended to limit the technical scope of the present invention. The technical scope of the present invention includes replacement and elimination of a part of structural element of each aspect and addition of another structural element thereto as referring to embodiments of the present invention.

A side-light type spread illuminating apparatus includes: a light guiding plate; a light source which is arranged along a light entering face of the light guiding plate; a double-sided prism sheet which is arranged at a light emitted face side of the light guiding plate; and an optical member which is arranged at a back face side facing the light emitted face of the light guiding plate. The optical member includes a light absorption member so as to prevent reflection of light that has been introduced into the optical member.

With this spread illuminating apparatus, the optical member may be formed entirely of the light absorption member. Alternatively, the optical member may adopt a two-layer structure composed of a reflectivity control member and a light absorption member, the reflectivity control member being able to partially reflect light while partially permeating light. Further, the optical member may have a three-layer structure composed of a reflectivity control member, a light absorption member and a bonding layer (or an adhering layer) placed therebetween.

In the first aspect of the present invention, a reflection rate of the optical member is 50% or lower.

In the first aspect of the present invention, a reflection rate of the optical member is 30% or lower.

In the first aspect of the present invention, a light absorption member is arranged at the light entering face of the light guiding plate except for an area that faces the light source and that has a width narrower than an external width of the light source.

In the first aspect of the present invention, the spread illuminating apparatus further includes a housing frame, which accommodates the light guiding plate. The housing frame is formed with black resin.

In the first aspect of the present invention, the spread illuminating apparatus further includes a housing frame, which accommodates the light guiding plate. The light absorption member is arranged at an inner circumferential face of the housing frame.

In the first aspect of the present invention, the light source is mounted on a flexible printed substrate. A light absorption member is arranged on a surface of the flexible printed substrate.

With the structure as described above, crosstalk between a right eye image and a left eye image can be effectively reduced when the spread illuminating apparatus according to the present invention is utilized for a backlight of a liquid crystal display device of a glasses-free 3D display system.

BRIEF DESCRIPTION OF THE DRAWINGS

FIG. 6A is a side view illustrating the example of a conventional glasses-free 3D display system while

DETAILED DESCRIPTION OF THE PREFERRED EMBODIMENTS

Figure 1:
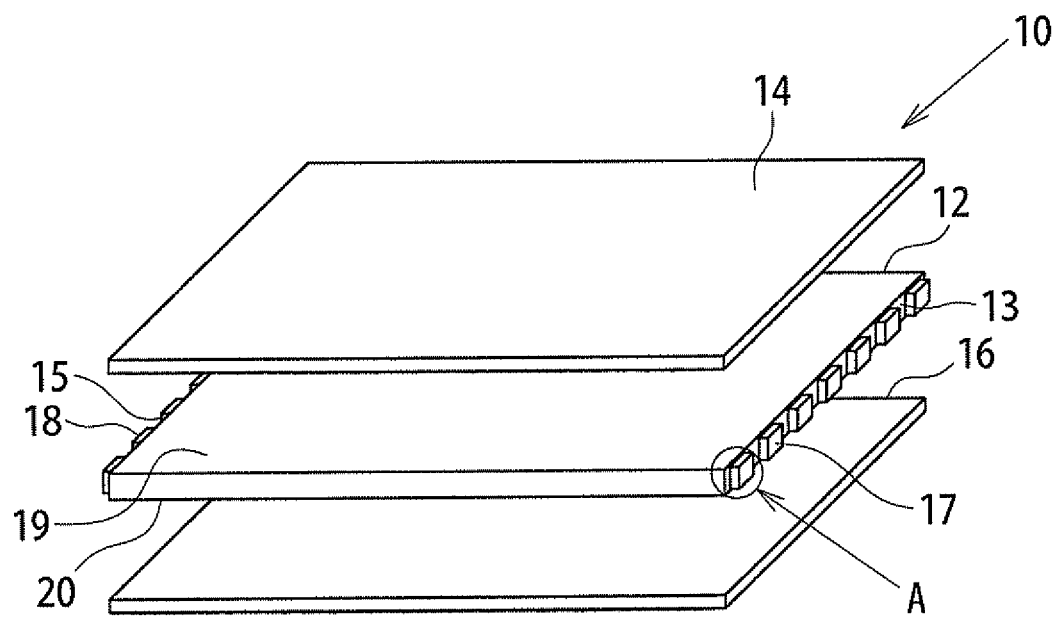
FIG. 1 is an exploded perspective view illustrating a main section of a spread illuminating apparatus according to a first embodiment of the present invention.

Hereinbelow, some embodiments of the present invention will be described with reference to the attached drawings. Here, every drawing illustrating the whole or a section of a spread illuminating apparatus is a schematic view where features are emphatically indicated for description purposes. Relative dimensions of respective sections in the drawings do not thus necessarily reflect actual scales.

FIG. 1 is an exploded perspective view illustrating a main section of a spread illuminating apparatus according to an embodiment of the present invention. A spread illuminating apparatus 10 illustrated in FIG. 1 is a side-light type spread illuminating apparatus which includes a light guiding plate 12 and light sources 17, 18. In the light guiding plate 12 composed of a plate-shaped light guiding member, one main face is defined by a light emitted face 19 while the other main face (the backside face) facing the light emitted face 19 is defined by a reflection face 20. Two side end faces directed toward each other are light entering faces 13, 15. A plurality of light sources (for example, light-emitting diodes) 17, 18 are arranged along each of the light entering faces 13, 15. Further, in the spread illuminating apparatus 10, a double-sided prism sheet 14 is arranged at the light emitted face 19 side of the light guiding plate 12, and a sheet-shaped optical member 16 is arranged at the reflection face 20 side of the light guiding plate 12.

The light guiding plate 12 is formed of a transparent resin material such as methacryl resin and polycarbonate resin. Light that has been introduced into the light guiding plate 12 through the light entering faces 13, 15 is adapted to propagate within the light guiding plate 12 while repeating total reflection between the light emitted face 19 and the reflection face 20. The propagated light is then emitted evenly from the emitted face 19 in processes described hereinabove.

Figure 6A:
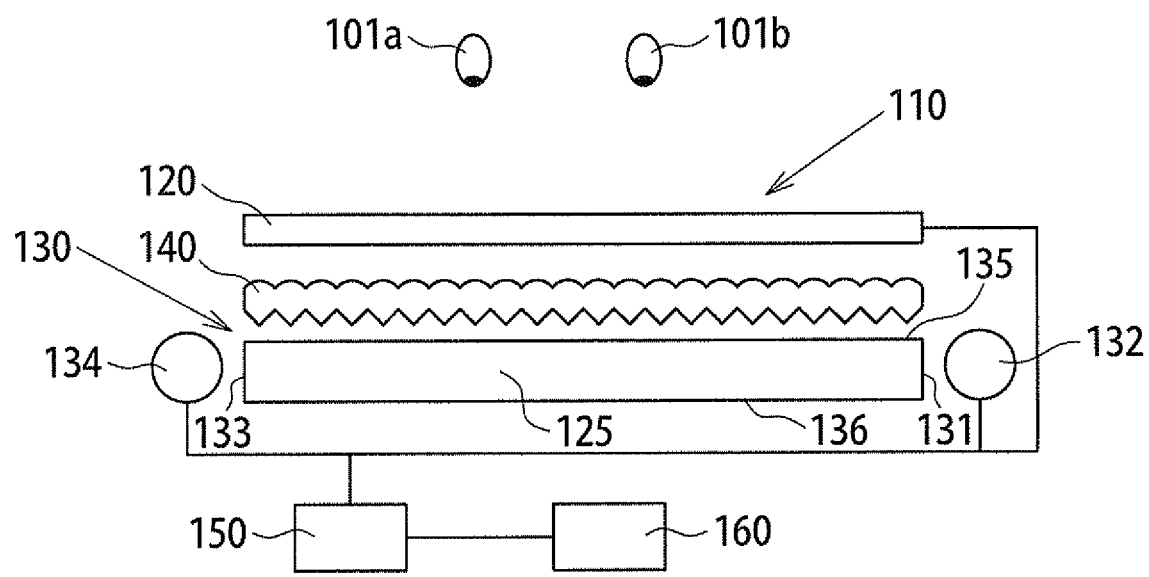

It is preferable that the spread illuminating apparatus 10 is applied to the backlight of a liquid crystal panel of a glasses-free 3D display system in FIG. 6A. To be more specific, the double-sided prism sheet 14 has a structure similar to that of the double-sided prism film 140 illustrated in FIG. 6A. Here, the present invention is not limited to the structure of the double-sided prism sheet 14, however may optionally adopt an appropriate structure as long as similar functions of the double-sided prism film 140 are performable.

Further, a plurality of linear prisms (not illustrated) that extend approximately in parallel to the light entering faces 13, 15 are arrangeable at the reflection face 20 of the light guiding plate 12. Light partially arriving at the reflection face 20 after introduced into the light guiding plate 12 through the light entering faces 13, 15 is firstly reflected by the linear prisms and then be emitted from the light emitted face 19, which allows light to be introduced into the double-sided prism sheet 14 at appropriate incident angles.

In the spread illuminating apparatus 10, an optical member 16 arranged at the reflection face 20 side of the light guiding plate 12 contains a light absorption member so as to prevent reflection of light that has been introduced into the optical member 16 (this eventually prevents light from reflecting and entering the light guiding plate 12). It is preferable that the reflection rate of the optical member 16 is 50% or lower, further preferably, 30% or lower.

Here, in the spread illuminating apparatus 10, light to be introduced into the optical member 16 can be categorized into: 1) light that has been leaked from the reflection face 20 of the light guiding plate 12; 2) light that has been emitted from the light sources 17, 18 but not introduced into the light guiding plate 12 and instead directly introduced into the optical member 16; 3) light that has been emitted from the light guiding plate 12 but reflected by the double-sided prism sheet 14 so as to enter the optical member 16 through the light guiding plate 12; and 4) light that has been emitted from the double-sided prism sheet 14 but reflected by the backside face of the liquid crystal panel so as to enter the optical member 16 through the double-sided prism sheet 14 and the light guiding plate 12.

Figure 7:
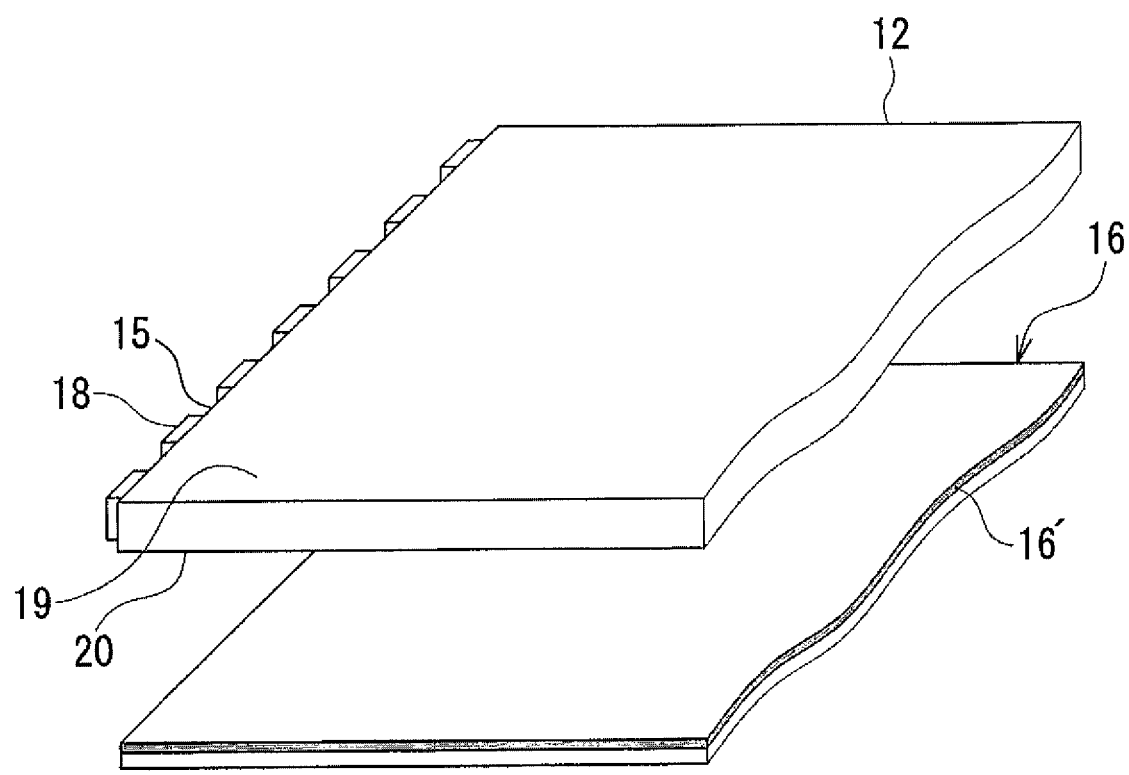
FIG. 7 is a perspective view illustrating the light guiding plate, the optical member and a reflectivity control member of the spread illuminating apparatus according to an embodiment of the present invention.

The optical member 16 may be completely formed by a light absorption member, which allows nearly perfect suppression of light that reflects and enters the optical member 16. Alternatively, the optical member 16 may adopt a two-layer structure in which to have a light absorption member, and a reflectivity control member 16' that reflects a part of light and permeates the rest of light, as illustrated in FIG. 7. The reflectivity control member 16' may face the reflection face 20. In this case, the optical member 16 may be structured by which the reflectivity control member 16' and the light absorption member bond (or adhere) to each other with bonding agent (or adhesive). Further, it is also possible to adopt a three-layer structure of a reflectivity control member 16', a bonding layer (or an adherent layer) and an optical absorption member.

The light absorption member applied to the optical member 16 may be a black film formed of a resin material (for example, polyethylene terephthalate (PET)) to which black pigment (for example, carbon black) is dispersed. The surface of such a black film may be subjected to roughened treatments. Further, the reflectivity control member 16' applied to the optical member 16 may adopt a multi-layer film structure in which resin materials (for example, PET) having mutually different refractive indexes are laminated as multiple layers. Alternatively, the reflectivity control member 16' may be a metal film and formed on a transparent substrate film. In this case, the permeability and reflection rate of the reflectivity control member 16' may become adjustable based on the thickness of the metal film.

In conventional spread illuminating apparatuses, optical members with high reflectivity are arranged at the reflection face 20 side of the light guiding plate 12. Accordingly, light that has been leaked from the reflection face 20 is to be returned as much as possible to maximize light utilization efficiencies.

In contrast, a main feature of the spread illuminating apparatus 10 is that the optical member 16 includes the light absorption member so as to prevent reflection of light that has been introduced into the optical member 16. With this structure, crosstalk between right eye images and left eye images can be effectively reduced (later explained) when the spread illuminating apparatus 10 is applied to the backlight of a liquid crystal panel of the glasses-free 3D display system.

Figure 2:
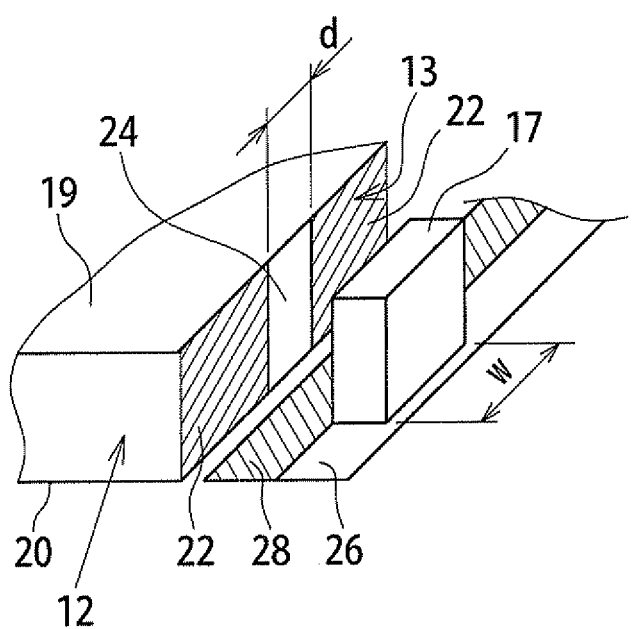
FIG. 2 is an enlarged perspective view illustrating the section A of FIG. 1.

Further, as illustrated in FIG. 2, the spread illuminating apparatus 10 may be provided with a light absorption member 22 arranged at the light entering face 13 of the light guiding plate 12 except for an area 24 that faces each of the light sources 17. In this case, each of the areas 24 works as an optical opening, which allows light that has been emitted from the light source 17 to enter the light guiding plate 12.

Normally, the width of an effective light-emitting area of the light source 17 is set smaller than an entire external width w including a lamp house and the like. Accordingly, in the spread illuminating apparatus 10, the light absorption member 22 is arranged so that at least an opening width d of the area 24 is smaller than the external width w of the light source 17. Here, the opening width d may be further reduced to become less than the width of the effective light-emitting area if required for achieving desired crosstalk reduction.

In the spread illuminating apparatus 10, the light absorption member 22 is preferably arranged at the light entering face 13 of the light guiding plate 12. That is, resin materials in which black pigment (for example, carbon black) is dispersed are adhered to the light entering face 13 by printing and the like. Further, not illustrated, light absorption members similar to the light absorption member 22 may be provided at the other light entering face 15 of the light guide plate 12.

Further, in the spread illuminating apparatus 10, each light source 17 is mounted on a flexible printed substrate 26. The flexible printed substrate 26 is arranged approximately in parallel relative to the emitted face 19 and the reflection face 20 of the light guiding plate 12. A light absorption member 28 is then arranged at an area (at the light guiding plate 12 side) in front of the mounting location of the flexible printed substrate 26 on which the light source 17 is arranged.

Similarly to the light absorption members arranged at the light entering faces 13, 15 of the light guiding plate 12, it is preferable that the light absorption member 28 is also arranged on the flexible printed substrate 26 by printing and the like. Here, the light absorption member 28 also adopts resin materials in which black pigment (for example, carbon black) is dispersed.

In the spread illuminating apparatus 10, an embodiment where the light absorption member 28 is arranged on the flexible printed substrate 26 is not limited to the one illustrated in FIG. 2. Although FIG. 2 illustrates an embodiment where the light absorption member 28 is arranged continuously at the area in front of the mounting location of the light source 17, the light absorption member 28 may be arranged discontinuously at an area only facing each of the light sources 17, that is, at the area approximately the same width as the external width w (or the width of the effective light-emitting area) of each of the light sources 17. Further, the light absorption member 28 may be arranged at an area laterally positioned relative to the mounting location of each light sources 17. Still further the light absorption member 28 may also be arranged at an area behind the mounting location of each light source 17. In this case, the light absorption member 28 may be arranged continuously at the back area. Instead, the light absorption member 28 is also arrangeable discontinuously at an area only facing each of the light sources 17, that is, at the area approximately the same width as the external width w (or the width of the effective light-emitting area) of each of the light sources 17. Moreover, the light absorption member 28 may be arranged at areas arbitrarily combining the abovementioned areas, that is, front, back and side areas of the mounting location of the light source 17 on the flexible printed substrate 26. Yet further, the light absorption member 28 may be arranged at the entire flexible printed substrate 26. Here, not illustrated, each light source 18 is mounted on a flexible printed substrate to which a light absorption member is similarly arranged.

The spread illuminating apparatus 10 may include a housing frame (not illustrated) which accommodates the light guiding plate 12. The housing frame may be formed of resin materials to which black pigment (for example, carbon black) is dispersed. Alternately, the housing frame may be provided with a light absorption member arranged at an inner circumferential face opposed to a side end face of the light guiding plate 12. In a case that the light absorption member is arranged at the inner circumferential face of a housing, the light absorption member is arranged as follows. Resin materials in which black pigment (for example, carbon black) is dispersed are adhered to the inner circumferential face of the housing by printing, and the like.

In the spread illuminating apparatus 10 based on the embodiment of the present invention, the optical member 16 not only includes the light absorption member, but predetermined light absorption members may be arranged at the light entering faces 13, 15 of the light guiding plate 12, the flexible printed substrate 26 and housing frame, or the housing frame may be blackened. In this case, to be explained later, further reduction of the crosstalk will be achieved.

Here, as long as the optical member 16 arranged at the reflection face 20 side of the light guiding plate 12 includes the light absorption member, the following may be optionally applicable, or combinable according to, for example, the specification of the spread illuminating apparatus 10 and the glasses-free 3D display system to which the spread illuminating apparatus 10 is adopted: 1) arranging of the predetermined light absorption member at the light entering face 13, 15 of the light guiding plate 12, the flexible printed substrate 26 or the housing frame; and 2) blackening of the housing frame.

EXAMPLES

Next, some examples of the present invention will be described.

In the examples, crosstalk is defined as follows.

Crosstalk (%)=[((left eye brightness at right light source ON)/(left eye brightness at left light source ON)+(right eye brightness at left light source ON)/(right eye brightness at right light source ON))/2]]×100

Here, the right eye brightness at left light source ON and the left eye brightness at left light source ON denote brightness at the spread illuminating apparatus 10 respectively in directions of a right eye and a left eye of a viewer when the left image light source (for example, the light source 18) is ON and the right image light source (for example, the light source 17) is OFF. Similarly, the right eye brightness at right light source ON and the left eye brightness at right light source ON denote brightness at the spread illuminating apparatus 10 respectively in directions of a right eye and a left eye of the viewer when the right image light source 17 is ON and the left image light source 18 is OFF.

Figures 3, 4:
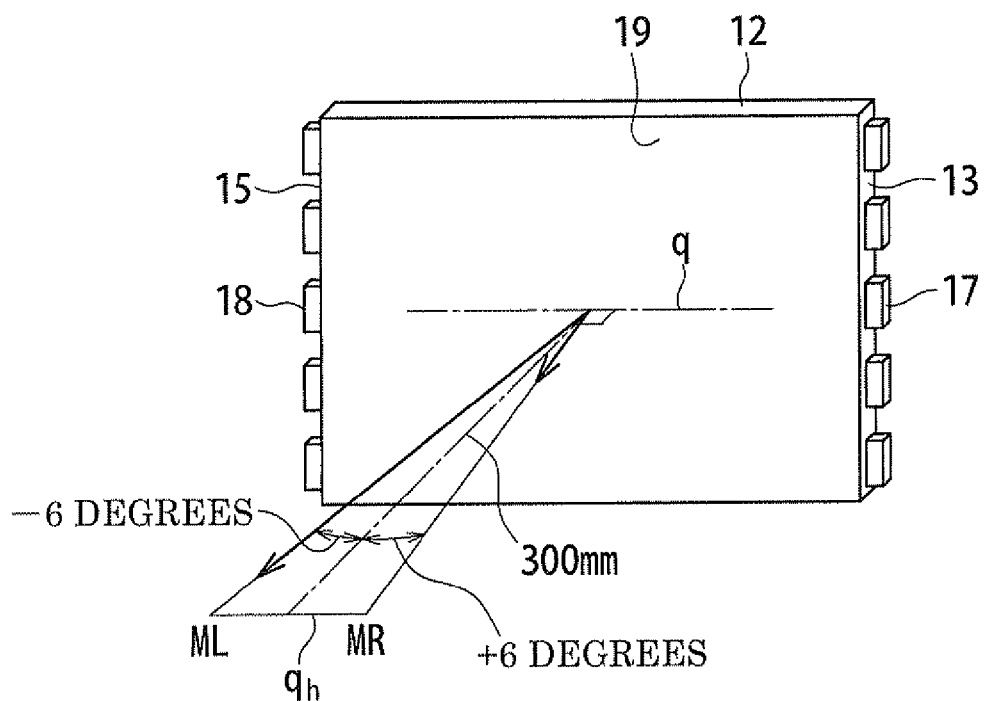
FIG. 3 is a view illustrating a condition of how to measure crosstalk in the present invention.
FIG. 4 is a table indicating a relation between the reflection rate of an optical member and crosstalk based on the spread illuminating apparatus according to the embodiment of the present invention.

Further, as illustrated in FIG. 3, measurement points for the respective brightness are defined to be a point MR obliquely viewing the center part of the light guiding plate 12 at +6 degrees and a point ML obliquely viewing the center part at −6 degrees on a line being apart by a distance of 300 mm against a line q which extends approximately perpendicularly to the light entering faces 13, 15 as passing through the center part of the light guiding plate 12. Then, brightness measured at the measurement points MR and ML viewing the center part of the light guiding plate 12 denotes the right eye brightness and the left eye brightness respectively. Here, the measurement was performed against an area having diameter of 1 mm at the center part of the backlight (light guiding plate 12) at timing respectively 30 seconds after turning-on of the left image light source 18 and the right image light source 17 by utilizing RISA-COLOR manufactured by HI-LAND as measurement equipment.

The distance (300 mm) for the measurement is determined in accordance with the structure of the double-sided prism sheet 14 which is used for the measurement. The measurement angle is varied in accordance with the distance. Here, a distance between a left eye and a right eye was set to have 63 mm.

In FIG. 3, the left eye brightness at the left light source ON and the right eye brightness at the left light source ON are schematically illustrated respectively with long and short arrows.

Further, light-emitting diodes (NSSW206A manufactured by Nichia Corporation: external width 3.6 mm, light-emitting area width 2.8 mm) are used for the light source 17, 18. Lighting is performed by supplying current of 20 mA to nine pieces of the light-emitting diodes which are mounted in series on a flexible printed substrate respectively at the light entering faces 13, 15 of the light guiding plate 12.

FIG. 4 is a table indicating relation between crosstalk and a reflection rate of the optical member arranged at the reflection face side of the light guiding plate. In FIG. 4, a total reflection rate (a measurement value of an omnidirectional reflection rate reflected at a surface of the optical member) is denoted as an indicator to show the reflection rate of the optical member.

The total reflection rate has been obtained by a measurement at a measurement range of 380 to 780 nm at 5 nm intervals by utilizing U-4000 (integrating sphere φ60 mm) manufactured by Hitachi High-Tech Fielding Corporation. Then, the total reflection rate is denoted by a Y-value calculated based on the second degree color-matching function of CIE1931.

The spread illuminating apparatus without blackening and arranging of the light absorption member on the housing frame and the flexible printed substrate has been applied for crosstalk measurement. Here, the light absorption member with black printing is arranged at the light entering face of the light guiding plate except for an optical opening having an opening width of 1 mm formed at an area facing each light-emitting diode. Further, values that has been measured at 30 seconds after applying voltage to the light-emitting diode are directly used for brightness in FIG. 4.

Figure 6B:
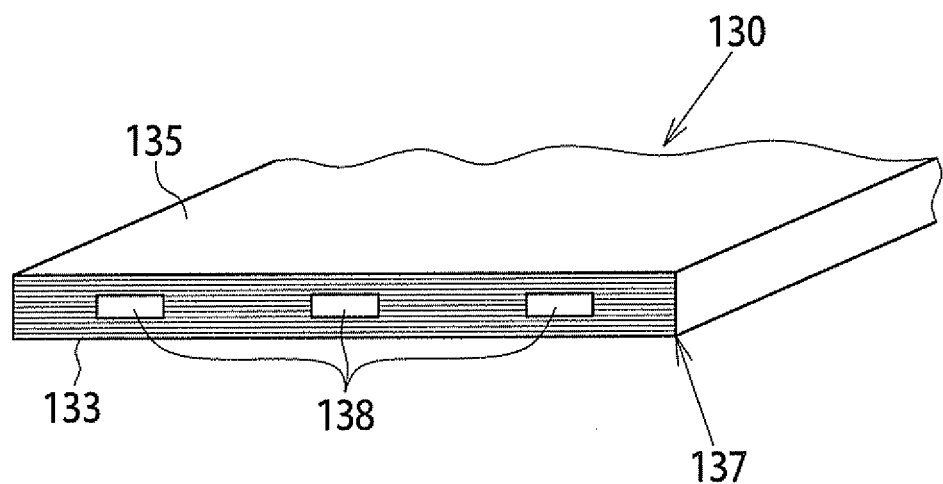
FIG. 6B is a perspective view illustrating a light guiding plate used for the glasses-free 3D display system of FIG. 6A.

Among samples indicated in FIG. 4, sample 1 is a comparative example in which a high reflectivity member is utilized for the optical member which corresponds to conventional arts that arrange reflection prevention means only at the light entering face of the light guiding plate as illustrated in FIG. 6B.

Among the samples indicated in FIG. 4, samples 2 to 6 are examples of the present invention. Among these examples, the optical members of samples 2 to 4 are structured respectively by laminating a reflectivity control member and an optical absorption member formed of a black film (with a roughened surface).

Further, the optical members of samples 5 and 6 are structured respectively only with an optical absorption member formed of a black film (without surface roughening) and a black film (with surface roughening).

FIG. 4 shows that crosstalk has been reduced with decrease of a reflection rate of the optical member. Based on crosstalk comparison of the examples (samples 2 to 6) of the present invention with the comparative example (sample 1), it is confirmed that the present invention is effective for further improving crosstalk characteristics against the conventional art.

For example, when the upper limit of practically allowable crosstalk is approximately 5%, it is possible to structure the spread illuminating apparatus of the present invention in such a manner that crosstalk can be suppressed below the allowable upper limit by setting the total reflection rate of the optical member to 50% or lower, preferably to 30% or lower.

Figure 5:
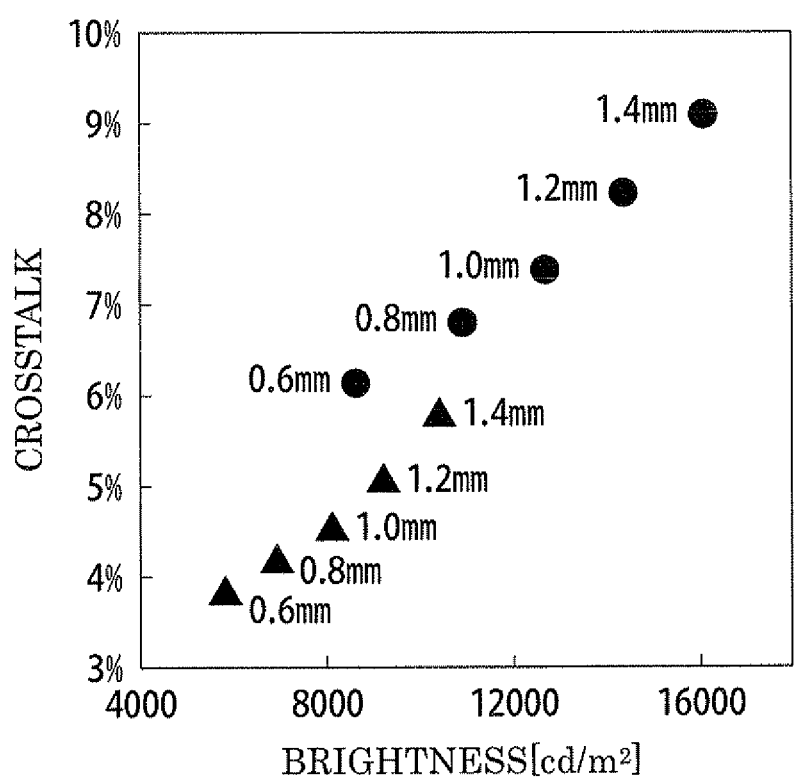
FIG. 5 is a graph indicating a relation between the opening width of a light input face and crosstalk based on the spread illuminating apparatus according to the embodiment of the present invention together with a comparative example.

The present invention is to improve crosstalk characteristics more effectively compared to the conventional art. This regard will be discussed with reference to FIG. 5. FIG. 5 is a graph with plotting measurement values of brightness and crosstalk in cases that the light absorption member is arranged at the light entering face of the light guiding plate with black printing so that the opening width of the optical opening is 1.4 mm, 1.2 mm, 1.0 mm, 0.8 mm and 0.6 mm by utilizing samples of which structure is the same respectively as the comparative example of sample 1 and the example of sample 6 in FIG. 4. In FIG. 5, data of the comparative example indicate black circles while data of the examples indicate black triangles.

In the example of the present invention similar to the comparative example, FIG. 5 also shows that crosstalk has been reduced as the opening width of the optical opening of the light entering face of the light guiding plate narrows (in other words, as the area of the light absorption member arranged at the light entering face increases). Thus, also in the present invention, it has been confirmed that arranging of the light absorption member at the light entering face of the light guiding plate is effective for reducing crosstalk.

In the example of FIG. 5, crosstalk has been suppressed up to approximately 6% (5.8% as an actual measurement value) while maintaining brightness at approximately 10000 cd/m$^2$ under the condition of the opening width of the optical opening with 1.4 mm. In contrast, considering the comparative example of FIG. 5, in order to suppress crosstalk up to the same degree (6.1% as an actual measurement value), it is required to lessen the opening width of the optical opening up to 0.6 mm. Brightness will be then decreased to about 8500 cd/m$^2$.

The above result will indicate that, compared to the light absorption member arranged only at the light entering face of the light guiding plate, the optical member included in the light absorption member according to the present invention can more effectively eliminate light which causes crosstalk out of light introduced into the light guiding plate emitted from the light source.

In other words, based on the result indicated in FIG. 5, the present invention enables to reduce crosstalk to a sufficient level while maintaining relatively high brightness by arranging the optical member including the light absorption member at the reflection face side of the light guiding plate compared to a case of having only the reflection prevention means arranged at the light entering face of the light guiding plate as in the conventional art. In this point, it is considered that crosstalk is effectively reduced.

Similar measurement with a sample having the same structure as sample 1 (crosstalk 7.3%) in FIG. 4 shows that crosstalk has been reduced up to 7.0% by utilizing the housing frame formed of black resin. Crosstalk has also been reduced up to 7.2% by utilizing the flexible printed substrate having black printing placed in front of the location on which the light source is mounted.

What is claimed is:

1. A sidelight type spread illuminating apparatus for a glasses-free 3D display system, comprising:
   a light guiding plate;
   a light source that is arranged along a light entering face of the light guiding plate;
   a double-sided prism sheet that is arranged at a light emitted face side of the light guiding plate; and
   an optical member that is arranged at a whole back face side facing the light emitted face of the light guiding plate, wherein
      the optical member evenly includes a first light absorption member unintermittently on a whole surface of the optical member so as to prevent reflection of light that has been introduced into the optical member.

2. The spread illuminating apparatus for the glasses-free 3D display system according to claim 1, wherein a reflection rate of the optical member is 50% or lower.

3. The spread illuminating apparatus for the glasses-free 3D display system according to claim 1, wherein a reflection rate of the optical member is 30% or lower.

4. The spread illuminating apparatus for the glasses-free 3D display system according to claim 1, wherein a second light absorption member is provided on the light entering face of the light guiding plate, except for an area of an opening that faces the light source, a width of the area being narrower than an external width of an effective light-emitting area of the light source, so as to partially block light.

5. The spread illuminating apparatus for the glasses-free 3D display system according to claim 1, further comprising a housing frame that accommodates the light guiding plate, wherein the housing frame is formed with black resin.

6. The spread illuminating apparatus for the glasses-free 3D display system according to claim 1, further comprising a housing that accommodates the light guiding plate, wherein a third light absorption member is arranged at an inner circumferential face of the housing frame.

7. The spread illuminating apparatus for the glasses-free 3D display system according to claim 1, wherein
   the light source is mounted on a flexible printed substrate, and
   a light absorption member is arranged on a surface of the flexible printed substrate on which the light source is mounted.

8. The spread illuminating apparatus for the glasses-free 3D display system according to claim 1, wherein the back face side of the light guiding plate includes a reflective surface disposed facing the first light absorption member of the optical member.

9. The spread illuminating apparatus for the glasses-free 3D display system according to claim 1, wherein the first absorption member is of a uniform thickness.

10. The spread illuminating apparatus for the glasses-free 3D display system according to claim 8, wherein the optical member further includes a reflectivity control member that reflects a part of light introduced into the optical member and permeates the rest of light where the reflectivity control member directly faces the reflection surface of the light guiding plate.

* * * * *